(12) United States Patent  
Coffin et al.

(10) Patent No.: US 6,433,955 B1  
(45) Date of Patent: Aug. 13, 2002

(54) SPLIT COMPOUND GEAR ASSEMBLY FOR A DRIVE LOADER

(75) Inventors: Paul C Coffin, Ft Collins; Leslie G Christie, Jr.; William Wesley Torrey, both of Greeley, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 166 days.

(21) Appl. No.: 09/657,335

(22) Filed: Sep. 7, 2000

Related U.S. Application Data

(60) Provisional application No. 60/208,361, filed on May 31, 2000.

(51) Int. Cl.[7] ............................................. G11B 15/60
(52) U.S. Cl. ........................................ 360/92; 360/96.5
(58) Field of Search ................................... 360/92, 96.5

(56) References Cited

U.S. PATENT DOCUMENTS

| | | | |
|---|---|---|---|
| 4,635,147 A | | 1/1987 | Durand et al. ................ 360/93 |
| 4,757,405 A | * | 7/1988 | Laudus ........................ 360/96.3 |
| 4,793,229 A | * | 12/1988 | Kleber ........................... 83/344 |
| 4,795,109 A | | 1/1989 | Chung et al. ................ 360/96.5 |
| 5,577,782 A | * | 11/1996 | Johnson et al. .............. 292/216 |
| 5,774,301 A | | 6/1998 | Manes et al. .................. 360/92 |
| 5,991,117 A | * | 11/1999 | Black et al. ................... 360/92 |
| 6,160,681 A | * | 12/2000 | Black et al. ................... 360/92 |
| 6,204,992 B1 | * | 3/2001 | Rockwell ....................... 360/92 |

FOREIGN PATENT DOCUMENTS

EP          0 389 160          9/1990

\* cited by examiner

*Primary Examiner*—Jefferson Evans

(57) ABSTRACT

A split compound gear assembly for a drive loader of the type having an overcentering mechanism with a drive loader actuator shaft. The split compound gear assembly may comprise a drive gear operably connected to a motor, and a first compound gear engaging the drive gear. The assembly also comprises a split compound gear engaging the first compound gear which allows the overcentering mechanism to quickly snap closed. The split compound gear includes an inner member including an inner, smaller gear which is freely rotatable within an outer member including an outer, larger gear. The split compound gear assembly may also include a sector gear which engages the inner gear of the split compound gear and rotates the drive loader actuator shaft.

15 Claims, 10 Drawing Sheets

SPLIT COMPOUND GEAR ASSEMBLY FOR A DRIVE LOADER

REFERENCE TO PROVISIONAL APPLICATION

The present application claims the benefit of U.S. Provisional Application Ser. No. 60/208,361 filed May 31, 2000 for SPLIT COMPOUND GEAR MECHANISM WITH PRESET BACKLASH, which is hereby incorporated by reference for all that is contained therein.

FIELD OF THE INVENTION

The present invention relates generally to read/write drives, and more particularly to drive loaders which assist in loading and securing media cartridges within read/write drives.

BACKGROUND OF THE INVENTION

A schematic illustration of a cartridge handling system 10 is shown in FIG. 1. A cartridge handling system 10 typically includes a plurality of cartridge storage locations 12, one or more read/write drives 14, and at least one cartridge handling apparatus 16 which is adapted to transfer media cartridges 18 among the cartridge storage locations 12 and drives 14.

Many types of media cartridges have a centrally-located hub which must be secured to a drive spindle in order for the media to spool and the cartridge to be read and/or written on. Specifically, the teeth of the cartridge hub must engage the teeth of the drive spindle. Such media cartridges include most tape cartridges such as DLT tape cartridges manufactured by Quantum Corporation of Threwsbury, Mass. To assist in loading, aligning, and securing a cartridge within a drive, as well as disengaging and unloading a cartridge, a drive loader may be provided which includes a cartridge locking mechanism and an overcentering mechanism. The cartridge locking mechanism may be any mechanism known in the art that, when closed, secures a cartridge within a drive so that the cartridge may be read and/or written to by the drive. When open, the cartridge locking mechanism allows the cartridge to be loaded into or unloaded from the drive. For example, the cartridge locking mechanism found in a Quantum DLT drive consists of a door which closes behind a cartridge, latches which engages notches in the cartridge, and a drive spindle which engages with the cartridge hub. However, the present invention may be utilized with any drive loader which comprises an overcentering mechanism such as described herein.

Referring to FIGS. 2 and 3, the overcentering mechanism 20 of a drive loader 19 may basically consist of a spring-loaded, pivotable drive loader actuator shaft 22 which pivots around an axis AA in order to actuate a cartridge locking mechanism 23 (only door of mechanism is shown) upon loading and unloading of a cartridge. An overcentering mechanism 20 may be found on Quantum DLT drives (Model Nos. 4000, 7000, and 8000, for example). A drive having an overcentering mechanism is shown and described in U.S. Pat. No. 5,774,301, which is hereby incorporated by reference for all that is contained therein.

When an overcentering mechanism is closed slowly rather than being allowed to snap shut with some force, the end result may be a drive misload. The misload occurs because the teeth on the cartridge hub have not been properly engaged with the teeth on the drive spindle. The cartridge locking mechanism can more reliably secure a cartridge hub on a drive spindle when the cartridge is jarred by snapping closed the overcentering mechanism with some force rather than closing the overcentering mechanism slowly and gently. The overcentering mechanism could be closed forcefully, yet manually, by attaching a handle to the actuator shaft in order to rotate the shaft by hand as described below with reference to FIGS. 4 and 5. However, in cartridge handling systems it is most preferable to close the overcentering mechanism remotely rather than manually.

One way to close the overcentering mechanism remotely is shown in U.S. Pat. No. 5,774,301, incorporated by reference above. This patent discloses an overcentering mechanism with a handle attached to the drive loader actuator shaft that is operated remotely by the cartridge handling apparatus. A problem with this design is that the handle typically requires a substantial amount of force to operate which must be provided by the cartridge handling apparatus lift system, thus requiring a more complex and expensive lift system for the cartridge handling apparatus. Another problem is that the cartridge handling apparatus is used for a purpose other than to simply retrieve and transport cartridges, that is, operating the handle. Specifically, the cartridge handling apparatus must be positioned in front of the drive while the cartridge is being secured within the drive, rather than simply ejecting the cartridge and then immediately traveling to another cartridge storage location or drive while the cartridge is being loaded into the drive.

Current designs may utilize a motor-driven gear assembly operatively connected to the drive loader actuator shaft to remotely activate the overcentering mechanism. Such a gear assembly 30 is shown in FIG. 6 and described in further detail below. However, this gear assembly 30 closes the overcentering mechanism slowly and gently rather than quickly with some force.

Thus, it is an object of the present invention to provide a drive loader which allows the cartridge locking mechanism to be remotely and quickly snapped closed, which is most preferable when the drive is located in an automated cartridge handling system.

It is also an object of the present invention to provide a drive loader with a motor-driven gear assembly that quickly snaps closed the cartridge locking mechanism.

It is also an object of the present invention to provide a split compound gear assembly for a drive loader which allows the overcentering mechanism actuator shaft to freely rotate to a closed position.

It is a further object of the present invention to provide a cartridge handling system which includes a drive having a drive loader with a split compound gear assembly.

It is yet another object of the present invention to provide a method for quickly closing a cartridge locking mechanism on a drive loader with some force.

SUMMARY OF THE INVENTION

The present invention is directed to a split compound gear assembly for a drive loader of the type having an overcentering mechanism with a drive loader actuator shaft. The gear assembly may comprise a split compound gear having an outer member and an inner member. The outer member may comprise an outer, larger gear, a free rotation area recessed from an outer annular flange, and a stop portion extending from the recessed free rotation area. The outer member may further comprise an inner annular flange adapted to rotatingly receive the inner member. The inner member may comprise an inner, smaller gear and an extending portion. The inner member is freely rotatable within the free rotation area of the outer member until the extending portion of the inner member abuts the stop portion of the outer member. The inner member is rotatable with the outer member when the extending portion abuts the stop portion. The split compound gear assembly may further comprise a sector gear which engages the inner gear of the split compound gear. The sector gear may comprise a bore which is adapted to receive the drive loader actuator shaft. The split compound gear assembly may further comprise a drive gear operably connected to a motor and a first compound gear engaging the drive gear. The first compound gear is not a split compound gear. Instead, the first compound gear comprises an outer, larger gear attached to an inner, smaller gear which may be integrally formed with the outer gear. The inner, smaller gear the first compound gear engages the outer, larger gear of said second compound gear.

The drive loader actuator shaft comprises an open position, an overcenter position, and a closed position. The shaft travels a first angular distance from the overcenter position to the closed position. The maximum angular distance between the outer member stop portion and the inner member extending portion is preferably larger than the first angular distance.

The present invention is also directed to a cartridge handling system comprising a plurality of cartridge storage locations. The system also includes at least one read/write drive comprising a drive loader having an overcentering mechanism having a drive loader actuator shaft which actuates a cartridge locking mechanism. The system further comprises a split compound gear assembly for the drive loader of the type described above.

The present invention is also directed to a method for closing a cartridge locking mechanism on a drive loader. The drive loader is of the type having an overcentering mechanism with an actuator shaft and a biasing member which biases rotation of the shaft to a closed position. The method comprises the initial step of providing a motor-driven split compound gear assembly such as the assembly described above. The method further comprises using said motor-driven split compound gear assembly to rotate the actuator shaft in a first rotational direction from an open position, whereby the cartridge locking mechanism is open, to an overcenter position. This step may involve remotely sending a signal to the split compound gear assembly to rotate the split compound gear in a second rotational direction, and then rotating the split compound gear in a second rotational direction until the inner member contacts the stop portion of the outer member. The split compound gear continues to rotate in the second rotational direction, whereby the inner member and the outer member rotate together, at least until the actuator shaft is in the overcenter position. The method further comprises the step of allowing the actuator shaft to rotate independently of the motor-driven split compound gear assembly in the first rotational direction from the overcenter position to the closed position such that the overcentering mechanism is quickly snapped closed. This step may involve allowing the inner member to disengage from the stop portion and slidingly (i.e., freely) rotate on the outer member in the second rotational direction.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
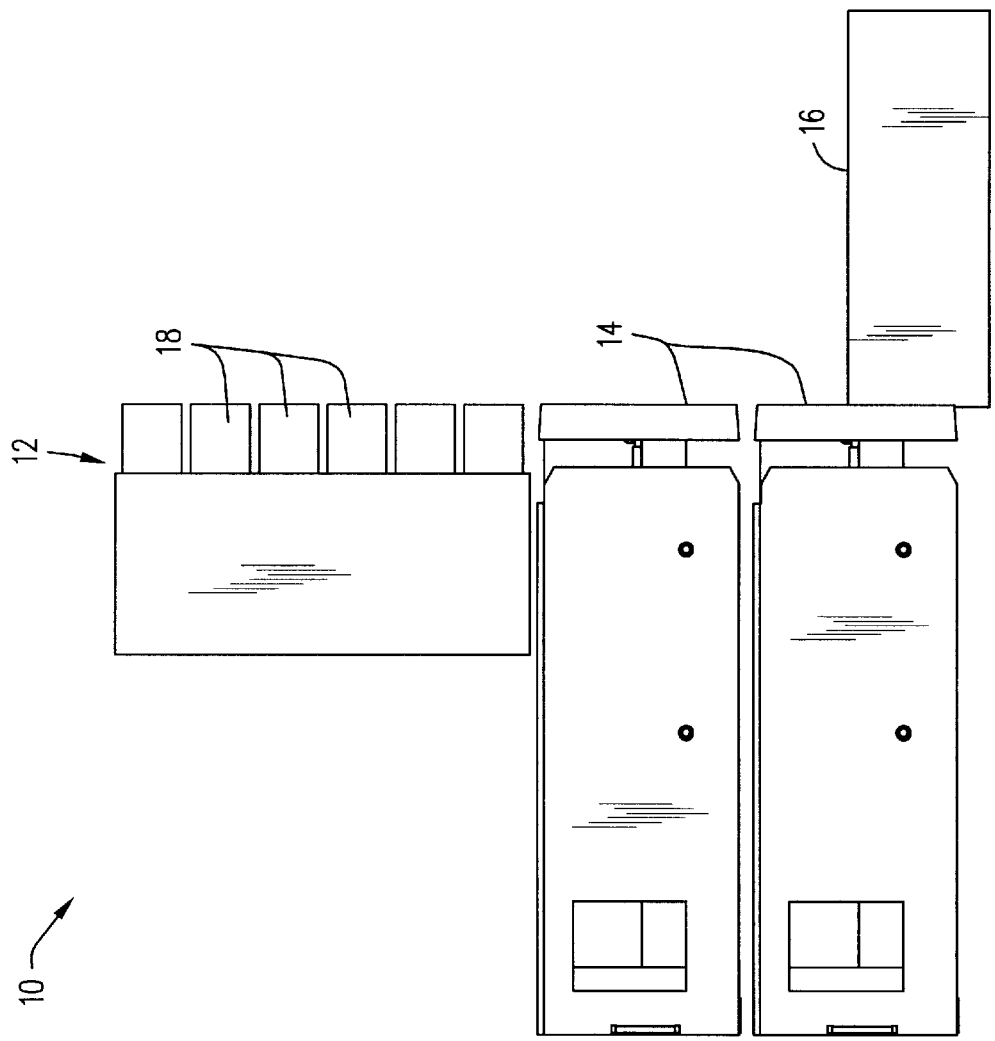
FIG. 1 is a schematic illustration of a cartridge handling system.

The present invention is specifically adapted for use in cartridge handling systems 10, FIG. 1, of the type having a plurality of cartridge storage locations 12, one or more read/write drives 14, and at least one cartridge handling apparatus 16 which is adapted to transfer media cartridges 18 among the cartridge storage locations 12 and drives 14. However, the present invention may be utilized in any read/write drive, whether or not the drive is housed within a cartridge handling system.

Figure 2:
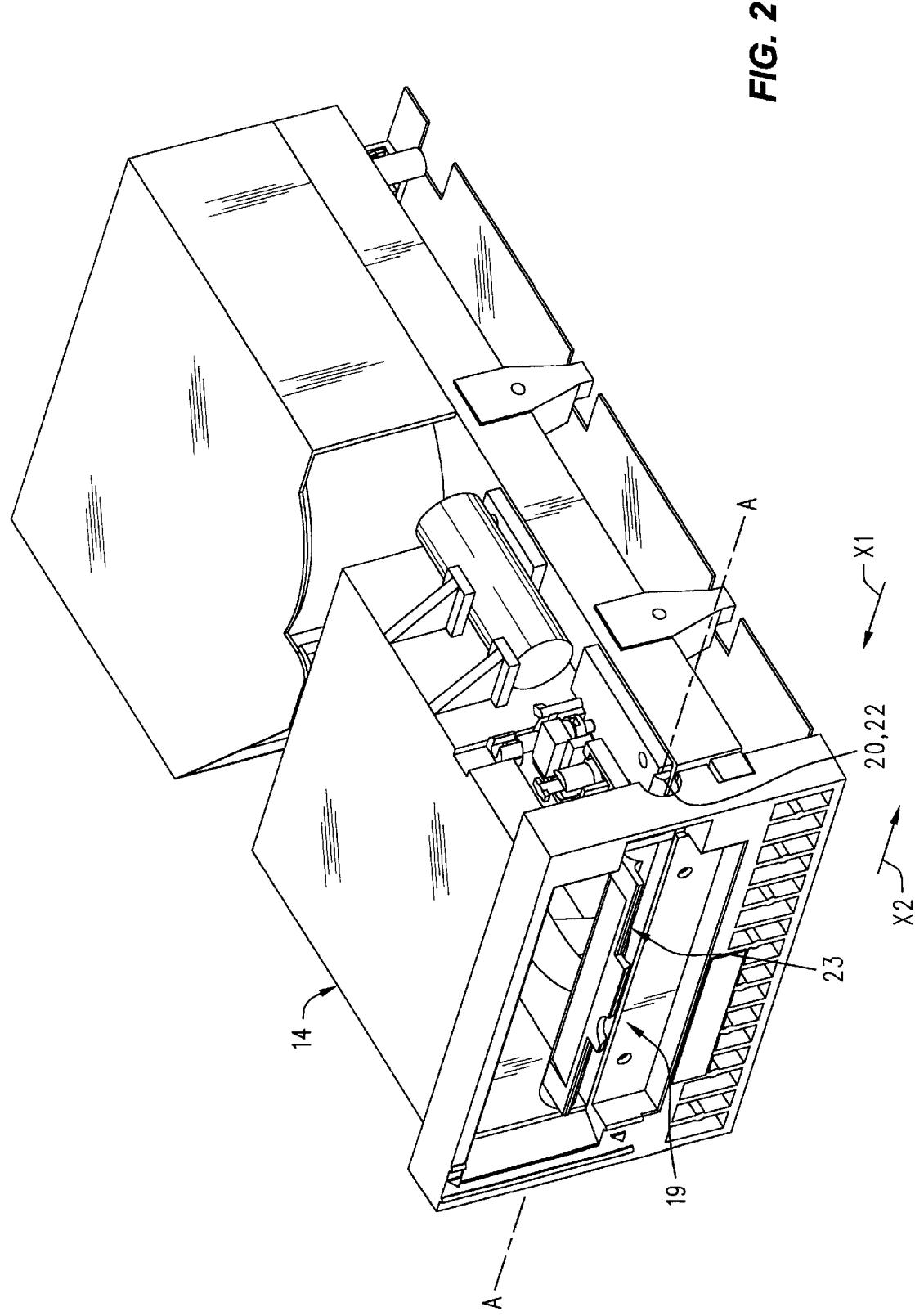
FIG. 2 is an isometric view of a read/write drive having a drive loader of the type utilized with the split compound gear assembly of the present invention.
Figure 3:
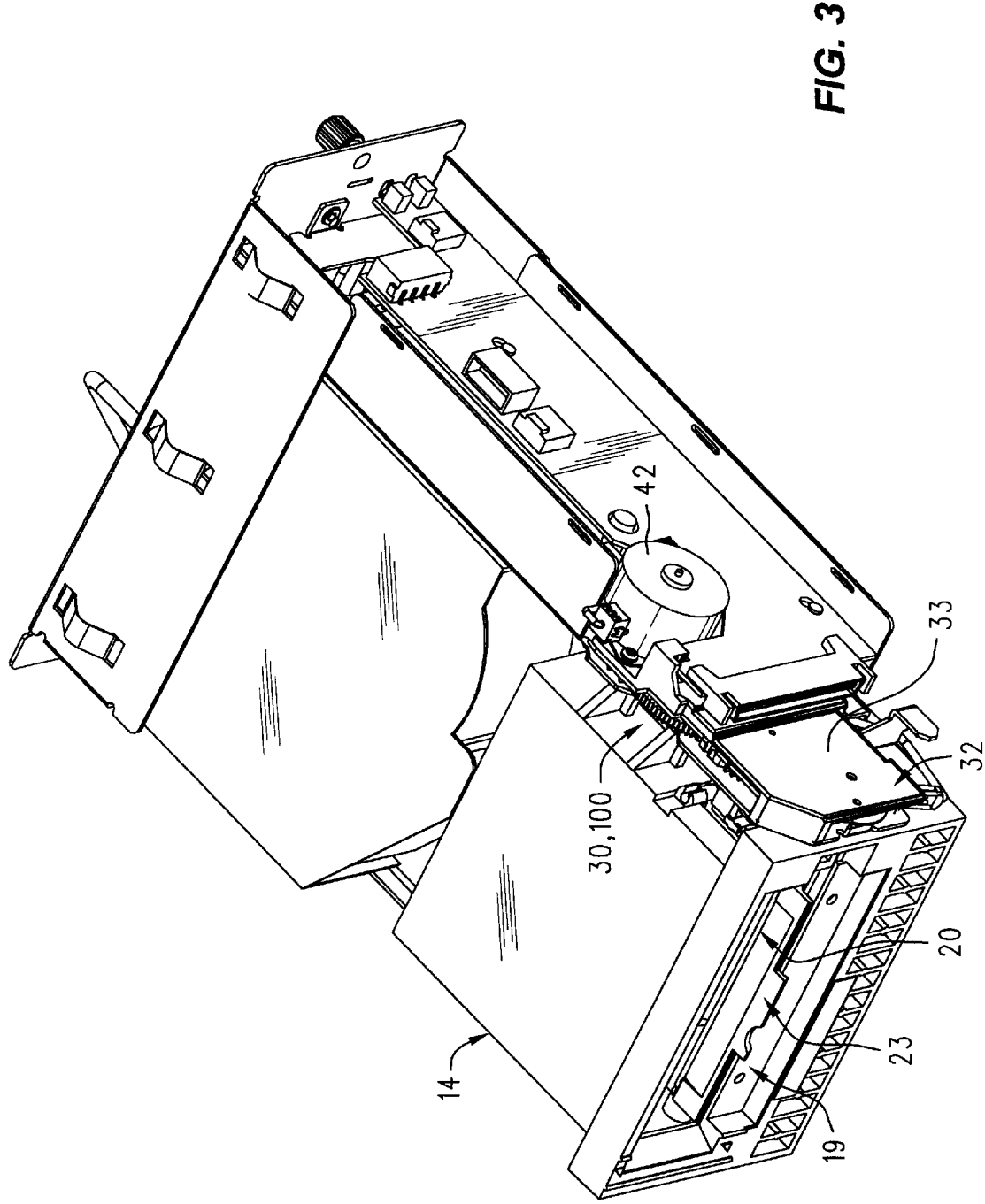
FIG. 3 is an isometric view of the read/write drive of FIG. 2 with a drive loader having a gear assembly.

FIG. 3 shows a drive 14 with either gear assembly 30, 100 mounted thereon. The present invention is directed to a split compound gear assembly 100 (FIG. 7), which is attached to and cooperates with an overcentering mechanism 20 (FIGS. 2–3) on a drive loader 19. As noted above, the overcentering mechanism 20 of a drive loader 19 may basically consist of a spring-loaded, pivotable drive loader actuator shaft 22 which actuates a cartridge locking mechanism 23 upon loading and unloading of a cartridge. It should be noted that any type of cartridge locking mechanism may be utilized with the present invention.

Figure 4:
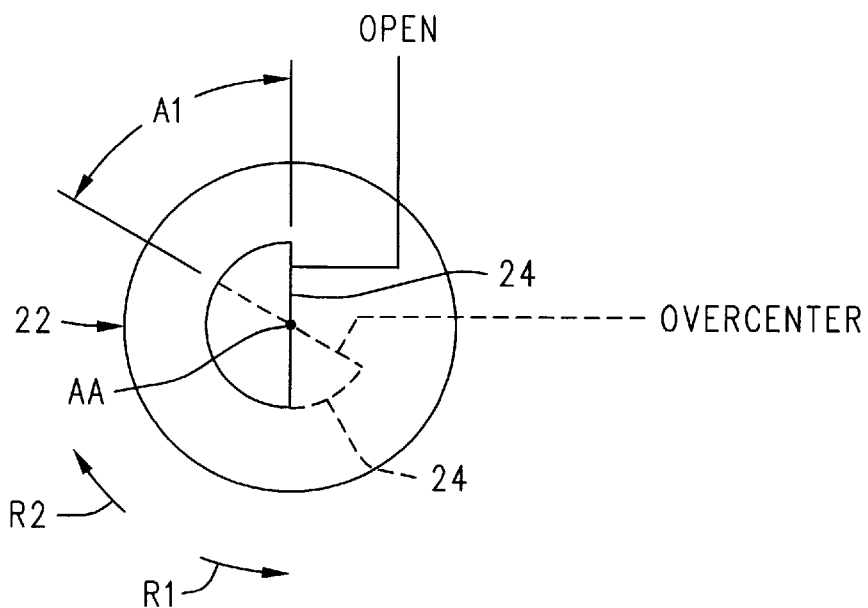
FIG. 4 is a schematic end view of a drive loader actuator shaft in an open position and an overcenter position.
Figure 5:
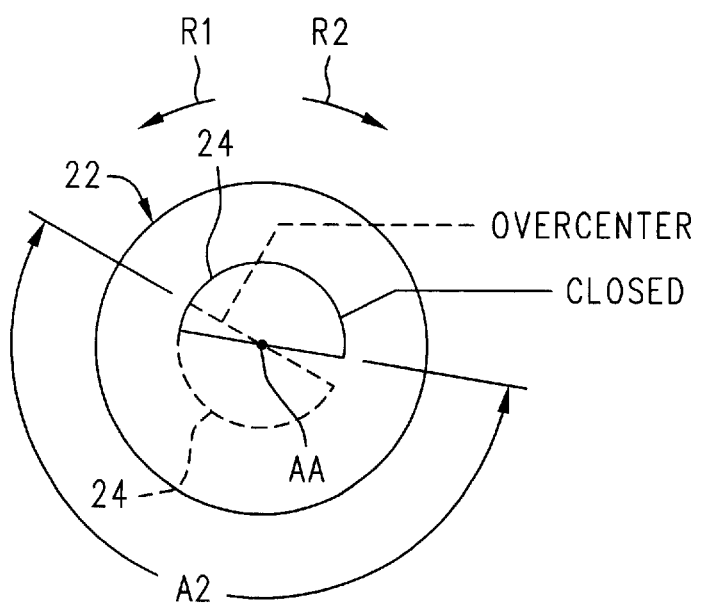
FIG. 5 is a schematic end view of a drive loader actuator shaft in an overcenter position and a closed position.

FIGS. 4 and 5 are schematic end views illustrating exemplary rotational movement of the actuator shaft 22 around an axis AA from an "open" position (solid lines, FIG. 4), whereby the cartridge locking mechanism 23 (FIGS. 2 and 3) is open and the drive is ready to receive or eject a cartridge, and a "closed" position (solid lines, FIG. 5), whereby the cartridge locking mechanism 23 is closed and a cartridge is secured within a drive, ready to be read and/or written on. As shown in FIGS. 2, 4 and 5, the end portion 24 of the actuator shaft 22 may be substantially D-shaped to facilitate rotation thereof by the gear assembly 100 of the present invention as described in further detail below. For orientation purposes, FIGS. 4 and 5 are looking toward the drive 14 in direction X1 (see FIGS. 2, 6 and 7).

As shown in FIG. 4, to secure a cartridge within a drive, the drive loader actuator shaft 22 is pivoted in a first rotational direction R1 around an axis AA an angular distance A1 from an "open" position to an "overcenter" position (shown in dashed lines). The shaft 22 is in an "overcenter" position when a biasing member (not shown) attached to the shaft 22 takes over the rotational movement of the shaft 22, i.e., the biasing member forces the shaft into a "closed" position as shown in FIG. 5. From the "overcenter" position (again shown in dashed lines in FIG. 5), the drive loader actuator shaft 22 then continues to rotate in direction R1 around axis AA an angular distance A2 to the "closed" position. To unlock the cartridge and allow it to be unloaded (and another cartridge to be loaded), the shaft 22 may be pivoted in a second rotational direction R2 around an axis AA by the gear assembly 100. The gear assemblies 30, 100 (FIGS. 3, 6 and 7) described below may pivot the shaft 22 in response to loading and unloading commands from a processor (not shown).

Figure 6:
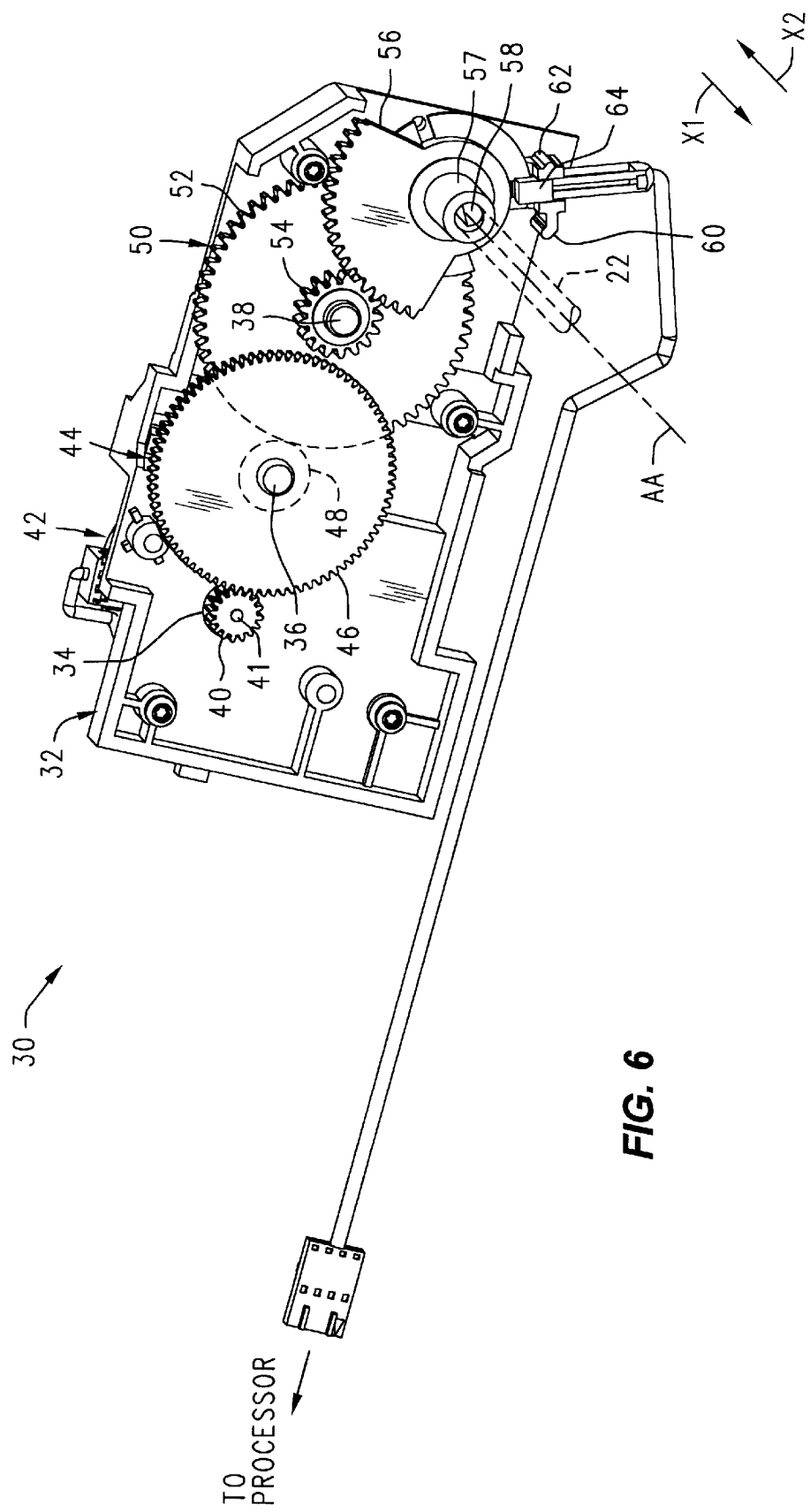
FIG. 6 is an isometric view of a gear assembly for a drive loader.

A gear assembly 30 is shown in FIG. 6 which remotely, but slowly, closes the cartridge locking mechanism 23 (FIGS. 2 and 3) in response to a command signal from a remotely-located processor (not shown). The gear assembly 30 may comprise a housing 32 that protects and houses the gears (described below) and is attachable to the drive 14 as shown in FIG. 3. The gear assembly 30 may further comprise a drive gear 40 (FIG. 6) operably attached to a motor 42 which may be mounted on the outside 33 (FIG. 3) of the housing 32. A drive shaft 41 which is attached to and may be integrally formed with the drive gear 40 may extend through an opening 34 in the housing 32. The drive gear 40 may be, for example, a 16-tooth spur gear. The drive gear 40 engages a first compound gear 44 which may be comprised of an outer, larger gear 46 attached to (and may be integrally formed with) an inner, smaller gear 48 (the outline thereof shown in dashed lines). The outer, larger gear 46 may be, for example, an 80-tooth spur gear, and the inner, smaller gear 48 may be, for example, a 16-tooth spur gear. The first compound gear may be rotatingly mounted on a shaft 36 extending from the housing 32.

As shown in FIG. 6, the inner, smaller gear 48 of the first compound gear 44 engages an outer, larger gear 52 of a second compound gear 50. The second compound gear may also be rotatingly mounted on a shaft 38 extending from the housing 32. The second compound gear 50 also comprises an inner, smaller gear 54 attached to (and may be integrally formed with) the outer, larger gear 52. The outer, larger gear 52 of the second compound gear 50 may be, for example, a 60-tooth spur gear, and the inner, smaller gear 54 of the second compound gear 50 may be, for example, a 17-tooth spur gear.

Still referring to FIG. 6, the inner, smaller gear 54 of the second compound gear 50 engages a sector gear 56. The sector gear 56 may be, for example, a 54-tooth partial spur gear with 18 teeth. Alternatively, a full gear (not shown) may be used in place of the sector gear 56, whereby only some of the gear teeth on a full gear are utilized. However, the sector gear design reduces the overall size of the gear assembly 30 and eliminates unneeded gear teeth. It is to be understood that the term "sector gear" as used herein refers to either a full gear whereby only some of the gear teeth are utilized or a partial gear as shown in the figures. The sector gear 56 may be rotatingly mounted on the housing 32 in the same manner as the first and second compound gears 44, 50. Alternatively, the sector gear 56 (and/or the first and second compound gears 44, 50) may comprise a pin (not shown) which extends through an opening (not shown) in the housing and is rotatable therewithin.

The sector gear 56 may comprise an extending portion 57 having a bore 58 which receives the drive loader actuator shaft 22 (shown in dashed lines). As shown in FIG. 6, at least a portion of the bore 58 may be substantially D-shaped so that the substantially D-shaped drive loader actuator shaft 22 (see FIGS. 2, 4 and 5) may be securely, nonslippingly rotated around axis AA by the sector gear 56. The gear assembly 30 may further comprise stops 60, 62 extending from the housing 32 which limit the rotation of the sector gear 56, and an optical sensor 64 which senses whether the cartridge locking mechanism 23 (FIGS. 2 and 3) is open or closed. It can be seen that, with this gear assembly 30, the rotational speed of the shaft 22 is always controlled by and is proportional to the rotational speed of the motor 42. With this design, the shaft 22 is never free to rotate independently of the gear assembly 30.

Figure 7:
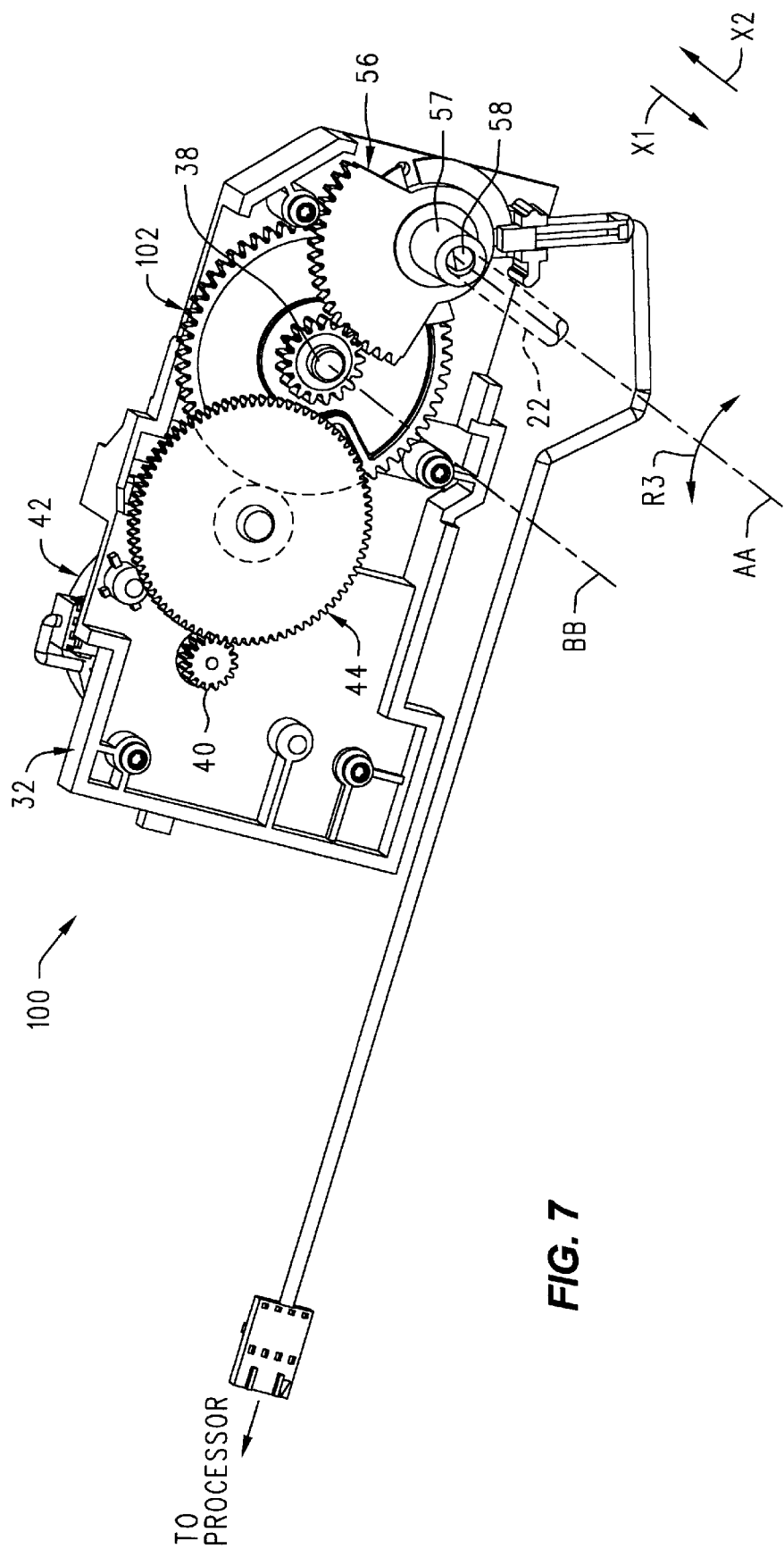
FIG. 7 is an isometric view of a split compound gear assembly for a drive loader.

As shown in FIG. 7, the gear assembly 100 of the present invention may be substantially identical to the gear assembly 30 of FIG. 6, except that the second compound gear 50 of the gear assembly 30 is replaced by a split compound gear 102. Basically, the split compound gear assembly 100 uses the motor 42 and gears 40, 44, 56, 102 to rotate the shaft 22 from an "open" position to an "overcenter" position and then allows the shaft 22 to freely rotate, independently of the gear assembly 100, in the first rotational direction RI from the "overcenter" position to the "closed" position (FIG. 5). This free rotation allows the cartridge locking mechanism 23 (FIGS. 2 and 3) to quickly snap closed.

Figure 8:
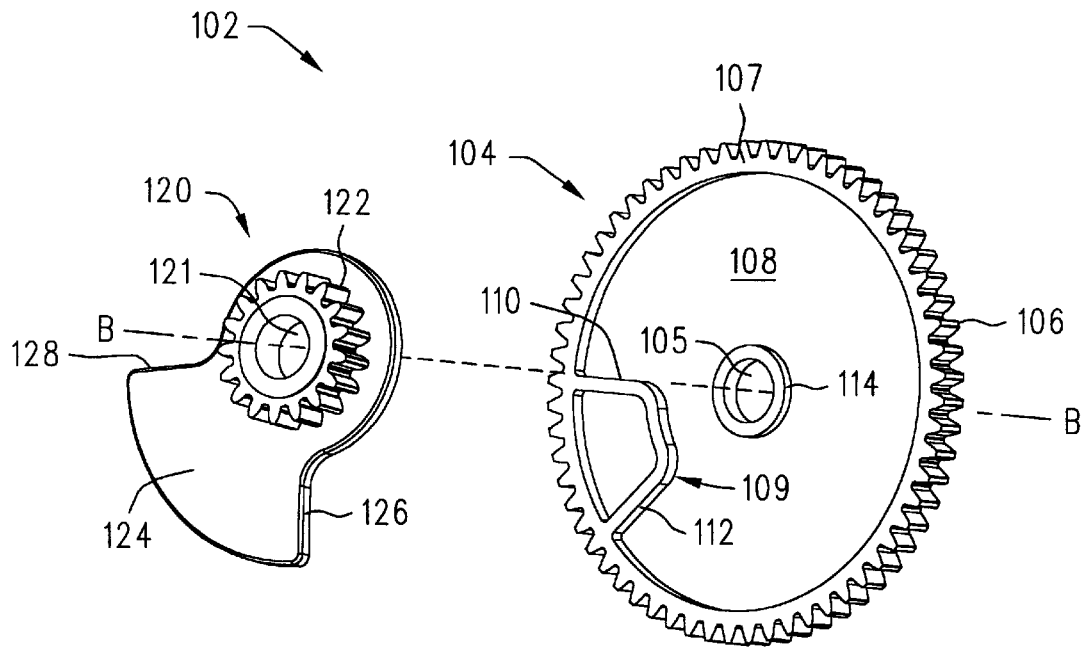
FIG. 8 is an exploded view of a split compound gear from the split compound gear assembly of FIG. 7.
Figure 9:
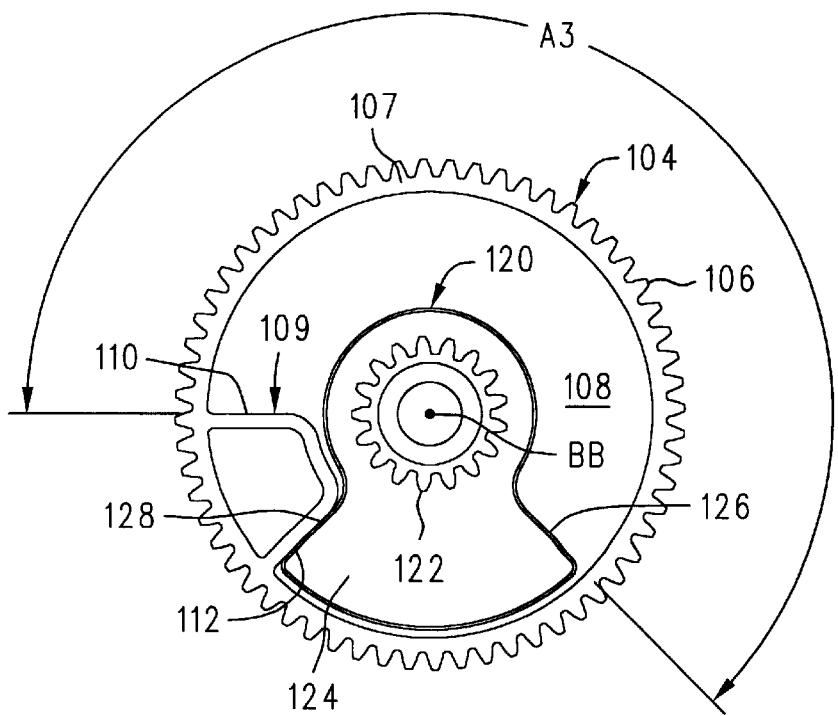
FIG. 9 is a front view of the split compound gear of FIG. 8.

As best shown in FIGS. 8–9, the split compound gear 102 comprises an outer member 104 having an outer, larger gear 106 which may be, for example, a 60-tooth spur gear, and is substantially the same as the outer, larger gear 52 described above. The outer member 104 may further comprises a free rotation area 108 which may be recessed from an outer annular flange 107. The split compound gear 102 also comprises an inner member 120 having an inner, smaller gear 122 which may be, for example, a 17-tooth spur gear, and is substantially the same as the inner, smaller gear 54 described above. However, the inner, smaller gear 122 of the split compound gear 102 is not attached to or integrally formed with the outer, larger gear 106. Instead, the outer member 104 may further comprise an inner annular flange 114 which is adapted to rotatingly receive the inner member 120. The inner member 120 may also comprise an extending portion 124 attached thereto (and may be integrally formed therewith) which is slidingly, rotatingly positioned within the free rotation area 108 of the outer member 104. The split compound gear 102 may be rotatingly mounted on the shaft 38 (FIG. 7) which may extend through bores 105, 121 having a common central axis BB in the outer member 104 and inner member 120, respectively.

The outer member 104 further comprises a stop portion 109 having load transfer surfaces 110, 112 which coact with load transfer surfaces 126, 128, respectively, on the inner member extending portion 124. The inner member 120 is freely rotatable within the free rotation area 108 of the outer member 104 until the inner member 120 abuts the stop portion 109. More specifically, the inner member 120 is freely rotatable within the free rotation area 108 until the load transfer surfaces 110/126 or 112/128 on the stop portion/inner member, respectively, are in contact. When the load transfer surfaces 110/126 or 112/128 are in contact, the inner gear 122 rotates together with the outer gear 106 which, in turn, rotates the sector gear 56 (which may alternatively be a full gear as noted above) in a rotational direction R3 around an axis AA, FIG. 7. The sector gear 56 pivots the shaft 22 (shown in dashed lines in FIG. 7) in a corresponding rotational direction R3 around axis AA. When the shaft 22 reaches the "overcenter" position as described above (FIGS. 4 and 5), the inner gear 122 is again free to rotate within the free rotation area 108, and the shaft 22 snaps to a "closed" position also as described above (FIG. 5). It should be noted that the maximum angular distance A3, FIG. 9, between non-abutting load transfer surfaces, e.g., 110/128 (i.e., the maximum amount of free rotation that the inner member 120 may accomplish in any single revolution), is preferably somewhat larger than the angular distance A2, FIG. 5, (A2 is the angular distance that the shaft 22 travels from the overcenter position to the closed position) so that the shaft 22 may be allowed to snap to a fully closed position.

The above-described cooperation of the split compound gear 102, the sector gear 52, and the drive loader actuator shaft 22 is detailed in FIGS. 10–13. For orientation purposes, these figures are facing toward the gear assembly 100 and away from the drive 14 in direction X2 (see FIGS. 2, 6 and 7), oppositely from FIGS. 4 and 5. Thus, the rotational movement of the shaft 22 shown in FIGS. 10–13 will be a mirror image of the rotational movement of the shaft 22 shown in FIGS. 4–5. FIGS. 10–13 are hatched to indicate that these figures are partially cross-sectional views cutting through the extending portion 57 and bore 58 (FIG. 7) on the sector gear 56 and the D-shaped end 24 (FIGS. 4 and 5) of the shaft 22. It should be noted that the positions of the gears, shaft, etc., in FIGS. 4–5 and 10–13 are exemplary.

Figure 10:
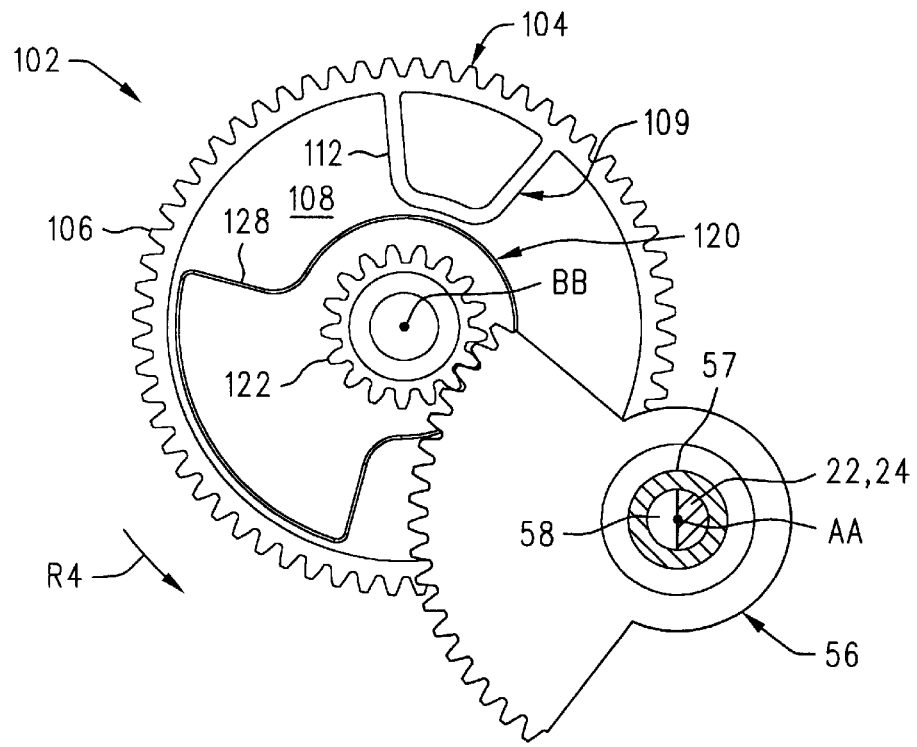
FIG. 10 is a front view of the split compound gear and a sector gear from the split compound gear assembly of FIG. 7, and the actuator shaft from the drive loader of FIGS. 2 and 3 in an open position.
Figure 13:
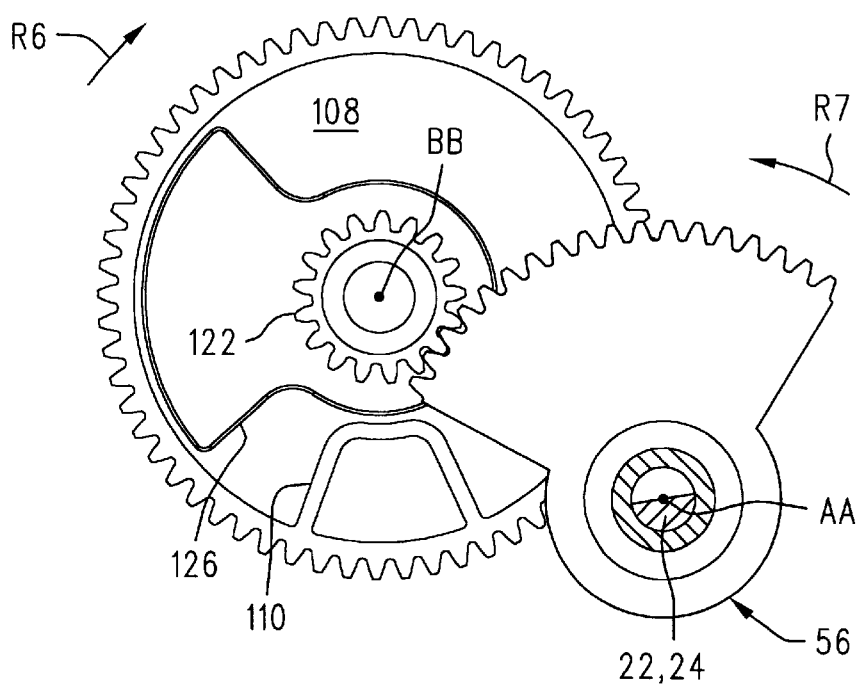
FIG. 13 is a front view of the split compound gear, sector gear, and actuator shaft of FIG. 10 in a closed position.

FIG. 10 illustrates the drive loader actuator shaft 22 in an "open" position, as also shown in FIG. 4 and described above. To force the shaft into a "closed" position as shown in FIGS. 5 and 13, the outer member 104 of the split compound gear 102 is rotated in direction R4 around an axis BB by the motor 42 and gears 40, 44 described above (FIGS. 6 and 7). The inner member 120, being free to rotate within the free rotation area 108, and sector gear 56 remain stationary until the load transfer surface 112 on the outer member 104 comes in contact with the load transfer surface 128 on the inner member 120 as shown in FIG. 11.

Figure 11:
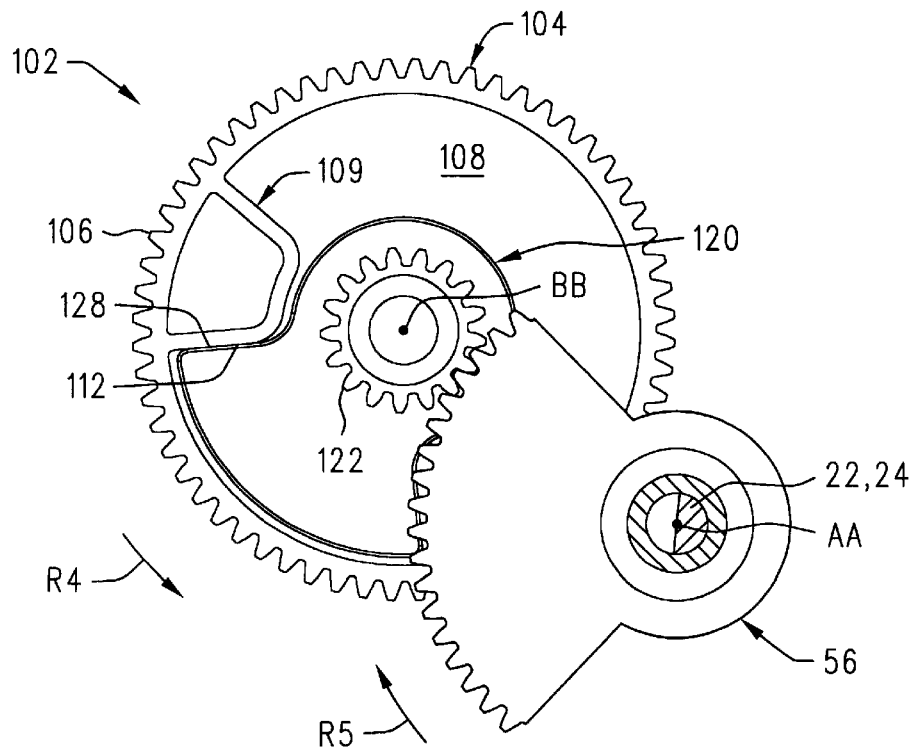
FIG. 11 is a front view of the split compound gear, sector gear, and actuator shaft of FIG. 10 in a partially rotated position.

Referring to FIG. 11, the inner member 120 (including inner gear is 122) begins to rotate in direction R4 around axis BB along with the outer member 104 when the load transfer surfaces 112, 128 are in contact. The inner gear 122 rotates the sector gear 56 in an opposite direction R5 around axis AA, causing the shaft 22 to also rotate in direction R5 around axis AA toward an "overcenter" position as described above relative to FIGS. 4 and 5.

Figure 12:
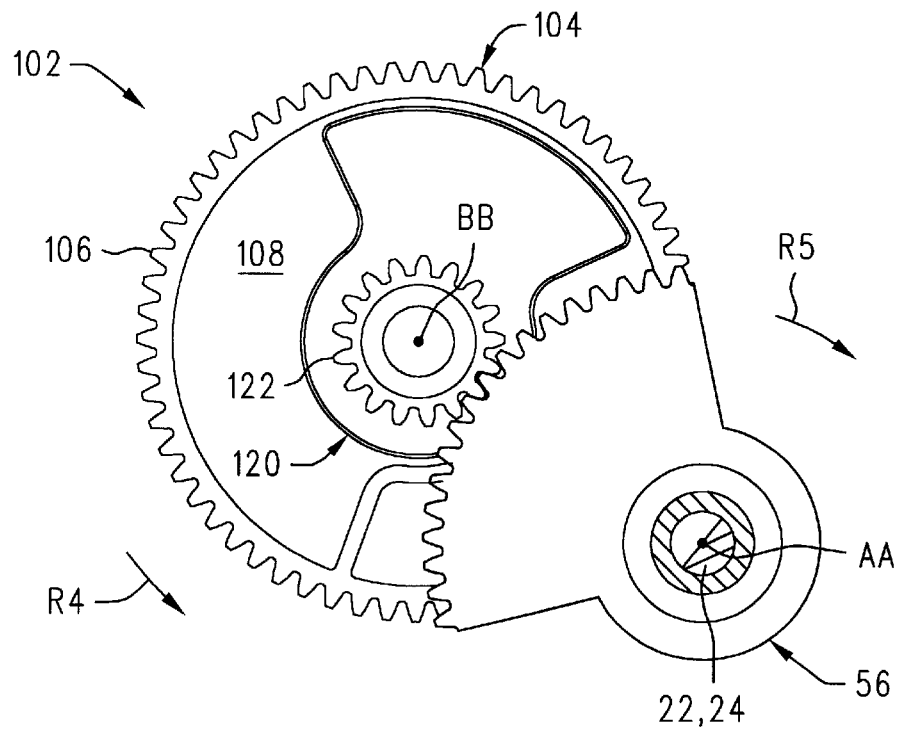
FIG. 12 is a front view of the split compound gear, sector gear, and actuator shaft of FIG. 10 in an overcenter position.

As shown in FIG. 12, when the spring-loaded shaft 22 reaches an "overcenter" position, control of the rotational movement of the sector gear 56 is transferred from the outer gear 106 to the shaft 22 biasing member (not shown). The biasing member rotates the sector gear 56 in direction R5 around axis AA, which rotates the inner gear 122 and inner member 120 in direction R4 around axis BB. Since the inner member 120 is freely rotatable within the free rotation area 108 of the outer member 104, the shaft 22 is allowed to forcefully snap into a "closed" position (FIGS. 5 and 13). At some point during free rotation of the inner member 120, the motor 42 may stop rotation of the outer member 104 in direction R4.

As shown in FIG. 13, the shaft 22 preferably reaches a "closed" position before the load transfer surfaces 110, 126 come into contact so that the shaft 22 may snap fully closed. To place the shaft 22 back into an "open" position, the outer member 104 is rotated by the motor 42 and gears 40, 44 described above (FIGS. 6 and 7) in direction R6 around axis BB. The load transfer surfaces 110, 126 come into contact and then the inner member 104 is also rotated in direction R6 around axis BB, which rotates the sector gear 56 in an opposite direction R7 around axis AA until the shaft 22 is in an "open" position.

Figure 14:
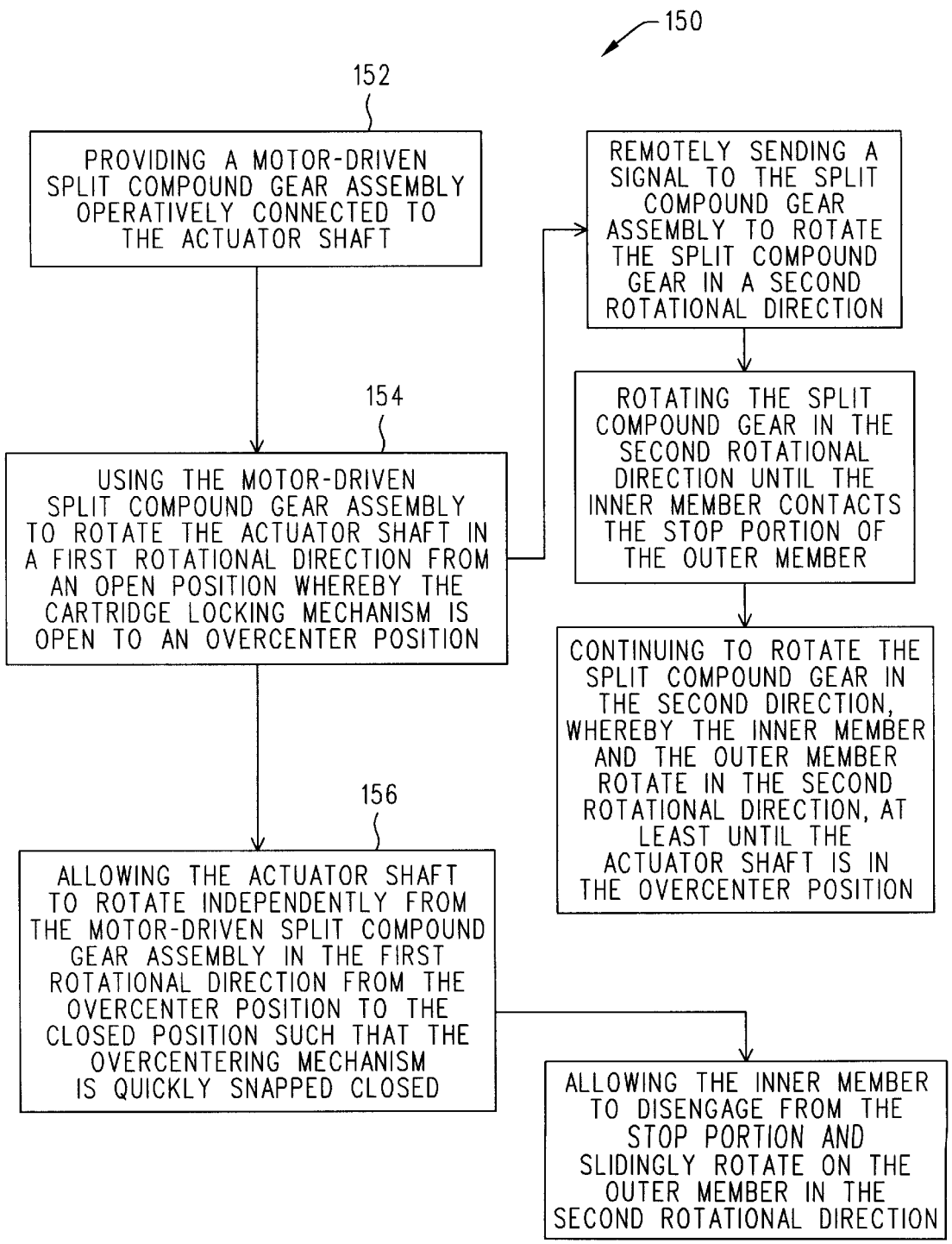
FIG. 14 is a flow chart illustrating a method for closing a cartridge locking mechanism on a drive loader.

FIG. 14 illustrates a method 150 for closing a cartridge locking mechanism 23 on a drive loader. With reference also to FIGS. 1-13, the method 150 comprises the initial step 152 of providing a motor-driven split compound gear assembly 100 operatively connected to the drive loader actuator shaft 22. The next step 154 comprises using the motor-driven split compound gear assembly 100 to rotate the actuator shaft in a first rotational direction R1 from an open position (whereby the cartridge locking mechanism 23 is open) to an overcenter position as shown in FIG. 4. This step 154 may comprise remotely sending a signal to the split compound gear assembly 100 to rotate the split compound gear 102 (via the motor 42 and gears 40, 44 as described above) in a second rotational direction R4, FIG. 10. The step 154 may further comprise rotating the split compound gear 102 in the second rotational direction R4 until the inner member 120 of the split compound gear 102 contacts the stop portion 109 of the outer member 104. The step 154 may further comprise continuing to rotate the split compound gear 102 in the second rotational direction R4, whereby the inner member 120 and the outer member 104 rotate in the second rotational direction R4, at least until the actuator shaft 22 is in the overcenter position (FIG. 4). The next step 156 comprises allowing the actuator shaft 22 to rotate independently of the motor-driven split compound gear assembly in the first direction RI from an overcenter position to the closed position as shown in FIG. 5 such that the overcentering mechanism is quickly snapped closed. This step 156 may comprise allowing the inner member 120 of the split compound gear 102 to disengage from the stop portion 109 and slidingly rotate on the outer member in the second rotational direction R4.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A split compound gear assembly for a drive loader comprising an overcentering mechanism, said overcentering mechanism comprising a drive loader actuator shaft, said gear assembly comprising:
   a) a split compound gear comprising:
      i) an outer member comprising an outer gear, a free rotation area, and a stop portion;
      ii) an inner member comprising an inner gear which is smaller than said outer gear and an extending portion, said inner member being freely rotatable within said free rotation area until said extending portion abuts said stop portion, and said inner member being rotatable with said outer member when said extending portion abuts said stop portion; and
   b) a sector gear which engages said inner gear, said sector gear comprising a bore which is adapted to receive said drive loader actuator shaft.

2. The split compound gear assembly of claim 1, said outer member further comprising:
   a) an outer annular flange, wherein said free rotation area is recessed from said outer annular flange and said stop portion extends from said free rotation area; and b) an inner annular flange adapted to rotatingly receive said inner member.

3. The split compound gear assembly of claim 1, further comprising:
   a) a drive gear operably connected to a motor; and
   b) a first compound gear engaging said drive gear, said first compound gear comprising an outer gear attached to an inner gear which is smaller than said outer gear, wherein said inner gear of said first compound gear engages said outer gear of said split compound gear.

4. The split compound gear assembly of claim 1, wherein:
   a) said drive loader actuator shaft comprises an open position, an overcenter position, and a closed position, said shaft traveling a first angular distance from said overcenter position to said closed position; and
   b) the maximum angular distance between said outer member stop portion and said inner member extending portion is larger than said first angular distance.

5. A split compound gear assembly for a drive loader comprising an overcentering mechanism, said overcentering mechanism comprising a drive loader actuator shaft, said gear assembly comprising:
   a) a drive gear operably connected to a motor;
   b) a first compound gear engaging said drive gear, said first compound gear comprising an outer gear attached to an inner gear which is smaller than said outer gear;
   c) a split compound gear engaging said inner gear of said first compound gear, said split compound gear comprising:
      i) an outer member comprising an outer gear, a free rotation area, and a stop portion, wherein said outer gear of said split compound gear engages said inner gear of said first compound gear;
      ii) an inner member comprising an inner gear which is smaller than said outer gear and an extending portion, said inner member being freely rotatable within said free rotation area until said extending portion abuts said stop portion; and
   d) a sector gear which engages said inner gear of said split compound gear, said sector gear comprising a bore which is adapted to receive said drive loader actuator shaft.

6. The split compound gear assembly of claim 5, said outer member further comprising:
   a) an outer annular flange, wherein said free rotation area is recessed from said outer annular flange and said stop portion extends from said free rotation area; and
   b) an inner annular flange adapted to rotatingly receive said inner member.

7. The split compound gear assembly of claim 5, wherein:
   a) said drive loader actuator shaft comprises an open position, an overcenter position, and a closed position, said shaft traveling a first angular distance from said overcenter position to said closed position; and
   b) the maximum angular distance between said outer member stop portion and said inner member extending portion is larger than said first angular distance.

8. A cartridge handling system, comprising:
   a) a plurality of cartridge storage locations;
   b) at least one read/write drive comprising a drive loader having an overcentering mechanism which actuates a cartridge locking mechanism, wherein said overcentering mechanism comprises a drive loader actuator shaft;
   c) a split compound gear assembly for said drive loader, said gear assembly comprising:
      i) a split compound gear comprising an outer member comprising an outer gear, a free rotation area, and a stop portion, and an inner member comprising an inner gear which is smaller than said outer gear and an extending portion, said inner member being freely rotatable within said free rotation area until said extending portion abuts said stop portion, and said inner member being rotatable with said outer member when said extending portion abuts said stop portion; and
      ii) a sector gear which engages said inner gear, said sector gear comprising a bore which is adapted to receive said drive loader actuator shaft.

9. The cartridge handling system of claim 8, said outer member of said split compound gear assembly further comprising:
   a) an outer annular flange, wherein said free rotation area is recessed from said outer annular flange and said stop portion extends from said free rotation area; and
   b) an inner annular flange adapted to rotatingly receive said inner member.

10. The cartridge handling system of claim 8, said split compound gear assembly further comprising:
    a) a drive gear operably connected to a motor; and
    b) a first compound gear engaging said drive gear, said first compound gear comprising an outer gear attached to an inner gear which is smaller than said outer gear, wherein said inner gear of said first compound gear engages said outer gear of said split compound gear.

11. The cartridge handling system of claim 8, wherein:
    a) said drive loader actuator shaft comprises an open position, an overcenter position, and a closed position, said shaft traveling a first angular distance from said overcenter position to said closed position; and
    b) the maximum angular distance between said outer member stop portion and said inner member extending portion is larger than said first angular distance.

12. A method for closing a cartridge locking mechanism on a drive loader, said drive loader comprising an overcentering mechanism having an actuator shaft which actuates said cartridge locking mechanism and a biasing member which biases rotation of said shaft to a closed position whereby said cartridge locking mechanism is closed, said method comprising the steps of:
    a) providing a motor-driven split compound gear assembly operatively connected to said actuator shaft;
    b) using said motor-driven split compound gear assembly to rotate said actuator shaft in a first rotational direction from an open position whereby said cartridge locking mechanism is open to an overcenter position; and
    c) allowing said actuator shaft to rotate independently of said motor-driven split compound gear assembly in said first rotational direction from said overcenter position to said closed position such that said overcentering mechanism is quickly snapped closed.

13. The method of claim 12 wherein said split compound gear assembly comprises a split compound gear comprising an outer member having a stop portion and an inner member slidingly, rotatingly mounted on said outer member, and wherein said step of using said motor-driven split compound gear assembly to rotate said actuator shaft comprises:
    a) remotely sending a signal to said split compound gear assembly to rotate said split compound gear in a second rotational direction;
    b) rotating said split compound gear in said second rotational direction until said inner member contacts said stop portion of said outer member; and c) continuing to rotate said split compound gear in said second rotational direction, whereby said inner member and said outer member rotate in said second rotational direction, at least until said actuator shaft is in said overcenter position.

14. The method of claim 12 wherein said step of allowing said actuator shaft to rotate independently of said motor-driven split compound gear assembly comprises allowing said inner member to disengage from said stop portion and slidingly rotate on said outer member in said second rotational direction.

15. A split compound gear assembly for a drive loader comprising an overcentering mechanism, said overcentering mechanism comprising a drive loader actuator shaft, said gear assembly comprising:

a) a motor means for rotating a drive gear means;

b) said drive gear means for rotating a first compound gear means;

c) said first compound gear means for rotating a split compound gear means;

d) said split compound gear means for rotating a sector gear means and for allowing said overcentering mechanism to quickly snap closed, said split compound gear means comprising:

i) an outer member comprising an outer gear, a free rotation area, and a stop portion;

ii) an inner member comprising an inner gear which is smaller than said outer gear and an extending portion, said inner member being freely rotatable within said free rotation area until said extending portion abuts said stop portion, and said inner member being rotatable with said outer member when said extending portion abuts said stop portion; and d) said sector gear means for rotating said drive loader actuator shaft.

\* \* \* \* \*